Aug. 21, 1962    P. GOLDBERG ET AL    3,050,655
ELECTROLUMINESCENT DEVICE
Filed Feb. 11, 1958
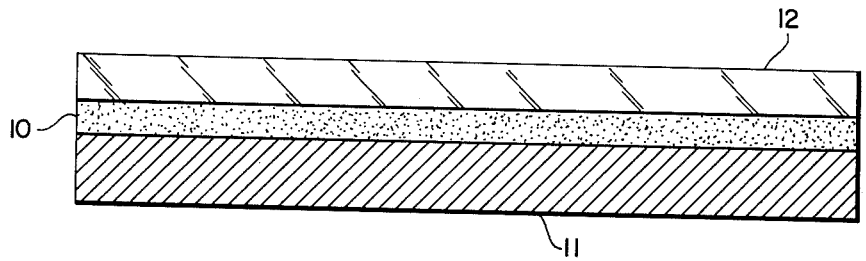
INVENTORS
PAUL GOLDBERG
ALLEN L. SOLOMON
BY
ATTORNEY United States Patent Office 3,050,655
Patented Aug. 21, 1962

3,050,655
ELECTROLUMINESCENT DEVICE
Paul Goldberg, Long Beach, and Allen Louis Solomon, Glen Cove, N.Y., assignors, by mesne assignments, to Sylvania Electric Products Inc., Wilmington, Del., a corporation of Delaware
Filed Feb. 11, 1958, Ser. No. 714,481
3 Claims. (Cl. 313—108)

Our invention relates to electroluminescent devices.

Electroluminescent phosphors are phosphors which emit light in the presence of an electric field. Conventionally, such phosphors are dispersed in dielectric media and the resultant mixture is placed between two electrically conductive electrodes, at least one of which permits the passage of light therethrough, to produce an electroluminescent cell. A voltage is applied between the two electrodes and light is emitted from the mixture. Phosphors of this type are described in more detail in our U.S. Patent No. 2,982,740, granted May 2, 1961.

We have discovered that when electroluminescent phosphors are intimately mixed with non-electroluminescent, photoluminescent phosphors and this mixture is subsequently dispersed in dielectric media and excited by an electric field, the wavelength range of light emitted from the mixture will differ from the wavelength range of light emitted from the electroluminescent phosphor itself. Further, the mixture can emit light having still another wavelength range as an afterglow immediately upon removal of the electric field excitation.

In addition, when the emission from the electric field excited mixture falls within the spectral region of maximum eye sensitivity, the luminosity of this emission is substantially increased over that obtainable from the electroluminescent phosphor alone.

Accordingly, it is an object of the present invention to combine electroluminescent and non-electroluminescent phosphor components in an electroluminescent cell whereby the light emitted from the cell when under the influence of an electric field falls within a given wavelength range, while the light emitted by the electroluminescent phosphor component itself falls within a different wavelength range.

Another object is to provide a new and improved electroluminescent cell containing at least one electroluminescent phosphor component intimately mixed with at least one non-electroluminescent, photoluminescent component.

Still another object is to provide a new and improved electroluminescent cell which will emit light falling within a given wavelength range in the presence of an electric field and immediately upon removal of said field will emit as an afterglow light falling within a different wavelength range.

Yet another object is to provide a new and improved electroluminescent cell containing a mixture of both electroluminescent phosphor and non-electroluminescent, photoluminescent phosphor components wherein the luminosity of the light emitted from the mixture is substantially increased over that obtainable from the electroluminescent phosphor component alone.

These and other objects of our invention will either be explained or will become apparent hereinafter.

In accordance with the principles of our invention, between 10–90% by weight of an electroluminescent phosphor component and between 90%–10% by weight of a non-electroluminescent, photoluminescent phosphor component are intimately mixed together. The electroluminescent phosphor emits light falling within a first wavelength range under electric field excitation. The non-electroluminescent phosphor absorbs light of this first range, and, after such absorption, will emit light within a second range of longer wavelength.

Consequently, when this mixture is dispersed in a dielectric material and placed between the electrodes of an electroluminescent cell, excitation of the dispersion by an electric field will cause the cell to emit light falling within a third wavelength range defined by the sum of the first and second ranges. When the third wavelength range falls within a region of maximum eye sensitivity, the luminosity of the total light emission from the electric field excited mixture is substantially increased over that obtainable when the entire mixture is replaced by an equivalent amount of the electroluminescent phosphor component alone.

The photoluminescent but non-electroluminescent component can be phosphorescent, in which case the resultant dispersion under electric field excitation will also emit light falling within a third wavelength range. However, when the field is removed, the light emission from the electroluminescent component ceases, but the non-electroluminescent component continues emitting light falling within the second wavelength as an afterglow.

Our invention will now be described in more detail with reference to the illustrative examples which follow.

*Example I*

2 parts by weight of a zinc-cadmium sulfide electroluminescent phosphor containing about 5% by weight of cadmium sulfide and 95% by weight of zinc sulfide, activated with copper and co-activated with a chloride, as described in more detail in Example III of our U.S. Patent No. 2,982,740, was mixed with 1 part by weight of a non-electroluminescent, photoluminescent phosphor of the copper-activated zinc-sulfide type.

(This non-electroluminescent phosphor was prepared by blending copper sulfate with zinc sulfide in an amount sufficient to establish a copper concentration of $2 \times 10^{-4}$ gram atoms per mole of the sulfide. A chloride flux was blended with the mixture in an amount equal to about 8% by weight of the sulfide, this flux consisting of 3% barium chloride, 3% magnesium chloride and 2% sodium chloride, each percentage being by weight of the sulfide mixture. The resulting blend was fired in a covered crucible in air to a temperature of 1150° C. for six hours to produce the non-electroluminescent phosphor; when irradiated with ultra-violet, this phosphor exhibited green phosphorescence.)

The phosphor powders so produced were dispersed in castor oil, the dispersion 10 (see FIGURE) containing equal parts by weight of powders and castor oil. The resultant mixture was placed between a metal plate 11 and a piece of conducting glass 12, the glass-metal separation being about 0.005 inch.

An alternating voltage of 500 volts, 6000 cycles per second, was applied between the glass and the metal.

Light having both blue and green components, was emitted from the cell in the presence of the electric field. When the voltage was removed from the cell, the cell then emitted green light as an afterglow, this light decaying gradually below the visible threshold in a period of a few minutes.

In further experiments we found that as the relative concentration of the electroluminescent phosphor component was decreased toward a value of about 10% by weight, substantially the same results ensued although the intensity of the light emitted during the electric field excitation, as well as the total luminous energy emitted during afterglow, decreased. As the relative concentration of the electroluminescent phosphor was increased toward a value of about 90% by weight, the intensity of the light emitted during excitation increased and the total luminous energy emitted during afterglow decreased.

Example II 2 parts by weight of the electroluminescent phosphor component described in Example I was mixed with one part by weight of a yellow photoluminescent phosphor component containing 45 mole percent of cadmium sulfide and 55 mole percent of zinc sulfide activated with $1.5 \times 10^{-4}$ gram atoms per mole of mixture of silver and coactivated with chloride. The mixture of the two components was then dispersed in dielectric media and tested in a cell in the same manner as described in Example I.

Bluish-white light was emitted from the cell under electric field excitation; when the voltage was removed from the cell, there was no visible afterglow. The electroluminescent phosphor component alone was dispersed in dielectric media, the volume fraction of this component being identical with the volume fraction of the above described mixture of phosphor components. When the phosphor mixture and the dispersed electroluminescent component were tested in cells of like geometry under the same conditions, it was found that the luminosity of the mixture during field excitation was about 1.5 times as high as the luminosity from the electroluminescent phophor component alone.

We found that the relative proportions of the electroluminescent and non-electroluminescent components could be varied within the same limits as Example I. However, as the relative concentration of the electroluminescent phosphor component was decreased from the value give above, the intensity of the light emitted from the phosphor mixture decreased and the emitted light appeared whiter in color. Similarly, as the relative concentation of the electroluminescent component was increased over the value given above, the emitted light appeared more bluish.

Further experiments showed that various known solid dielectric materials, such as epoxy resins, glass, and the like, could be substituted for castor oil with substantially the same results.

While we have shown and pointed out our invention as applied above, it will be apparent to those skilled in the art that many modifications can be made within the scope and sphere of our invention.

What is claimed is:

1. A device comprising
(a) an electroluminescent cell provided with first and and second separate electrically conducting electrodes, at least one of said electrodes permitting the passage of light therethrough, and
(b) a layer placed between said electrodes composed of a phosphor mixture dispersed in dielectric media, said mixture consisting of 10–90% by weight of an electroluminescent phosphor component selected from the group consisting of the sulfides of zinc and zinc cadmium and 90–10% by weight of a non-electroluminescent photoluminescent phosphor component composed of copper activated chloride coactivated zinc sulfide, said electroluminescent phosphor component emitting visible light falling within a first wavelength range when excited by an electric field and said non-electroluminescent photoluminescent phosphor component absorbing incident light falling within said first wavelength range and thereafter emitting visible light falling within a second range of wavelength, said non-electroluminescent phosphor component further emitting light within said second range of wavelength as an afterglow immediately after removal of said electric field from said electrodes.

2. A device comprising
(a) an electroluminescent cell provided with first and second separate electrically conducting electrodes, at least one of said electrodes permitting the passage of light therethrough, and
(b) a layer placed between said electrodes composed of a phosphor mixture dispersed in dielectric media, said mixture consisting of 10–90% by weight of an electroluminescent phosphor component selected from the group consisting of the sulfides of zinc and zinc cadmium and 90–10% by weight of a non-electroluminescent photoluminescent phosphor component composed of copper activated chloride coactivated zinc sulfide, said electroluminescent component being a copper-activated chloride coactivated zinc cadmium sulfide containing 5% by weight of cadmium sulfide and 95% by weight of zinc sulfide and said non-electroluminescent component being fired with a chloride flux containing about 8% by weight of sulfide, said electroluminescent phosphor component emitting visible light falling within a first wavelength range when excited by an electric field and said non-electroluminescent photoluminescent phosphor component absorbing incident light falling within said first wavelength range and thereafter emitting visible light falling within a second range of wavelength, said non-electroluminescent phosphor component further emitting light within said second range of wavelength as an afterglow immediately after removal of said electric field from said electrodes.

3. The device defined in claim 2 wherein said chloride flux contains approximately 3% barium chloride, 3% magnesium chloride, and 2% sodium chloride, said percentages being by weight of sulfide.

References Cited in the file of this patent

UNITED STATES PATENTS

| | | |
|---|---|---|
| 2,452,518 | Burns | Oct. 26, 1948 |
| 2,698,915 | Piper | Jan. 4, 1955 |
| 2,768,310 | Kazan | Oct. 23, 1956 |
| 2,921,218 | Larach | Jan. 12, 1960 |
| 2,924,732 | Lehmann | Feb. 9, 1960 |

OTHER REFERENCES

Lehmann: Journal of Electrochemical Soc., vol. 104, No. 1, January 1957, pp. 45–50.

Leverenz: Luminescence of Solids, 1950, Textbook, pp. 120 to 130, John Wiley & Sons, Inc., New York, N.Y.

Copenhafer: Three-Color Radar Screen, R.C.A., TN No. 50, pub. by RCA Laboratories, 1 page spec., 1957, Princeton, N.J.

Electroluminescent Cell With Long Light Decay and Color-Shift, by Simon Larach, RCA TN No. 10, received Aug. 9, 1957.

Electroluminescence With Storage, by Simon Larach, RCA-TN No. 18, received Aug. 9, 1957.